L. SEGUIN.
CONNECTING ROD ARRANGEMENT FOR STAR SHAPED MOTORS.
APPLICATION FILED AUG. 25, 1921.
1,401,284. Patented Dec. 27, 1921.
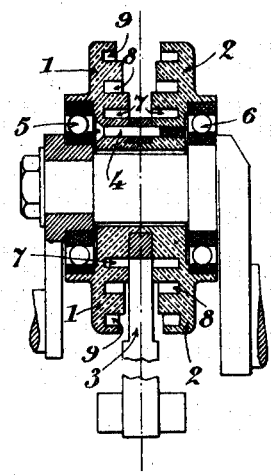
Fig. 1
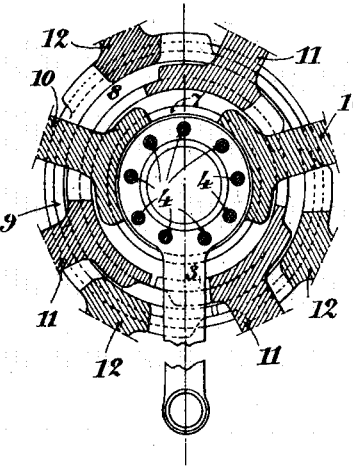
Fig. 2
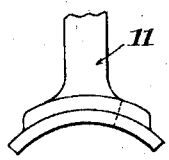
Fig. 3
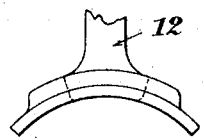
Fig. 7
Fig. 4
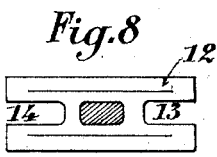
Fig. 8
Fig. 5
Fig. 9
Fig. 6
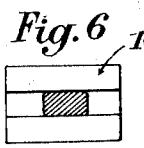
Fig. 10
INVENTOR
By Laurent Seguin
Wm Wallace White
ATTY.

UNITED STATES PATENT OFFICE.

LAURENT SEGUIN, OF PARIS, FRANCE, ASSIGNOR TO SOCIETE DES MOTEURS GNOME ET RHONE, OF PARIS, FRANCE.

CONNECTING-ROD ARRANGEMENT FOR STAR-SHAPED MOTORS.

1,401,284.    Specification of Letters Patent.    Patented Dec. 27, 1921.

Application filed August 25, 1921. Serial No. 495,300.

(GRANTED UNDER THE PROVISIONS OF THE ACT OF MARCH 3, 1921, 41 STAT. L., 1313.)

*To all whom it may concern:*

Be it known that I, LAURENT SEGUIN, citizen of the French Republic, residing at Paris, in the Republic of France, have invented new and useful Improvements in Connecting-Rod Arrangements for Star-Shaped Motors, (for which I have filed applications in France May 5, 1914, Patent No. 471,820, and in Japan Feb. 2, 1921,) of which the following is a specification.

This invention relates to a connecting rod arrangement for star-shaped motors, in which each of said rods is situated in line with the center of the crank pin at all times, and the relative displacement of each of the said rods is provided for in a perfect manner. This disposition has for its object to reduce to a minimum the reaction of the piston on the walls of the cylinder and to obtain for each connecting rod the same angular movement which each rod would assume were it normally connected with the crank pin.

The device represented by way of example in the accompanying drawings relates to a nine-cylinder star-shaped motor provided with three grooves for the sliding movement of the connecting rods.

Figure 1 is a general section of the connecting rod head attached to the main connecting rod, the auxiliary connecting rods being here supposed to be removed.

Fig. 2 is a front view of the connecting rod head attached to the main connecting rod, one of the shells of the head being removed.

Figs. 3 and 4 are two views of one of the intermediate auxiliary connecting rods.

Figs. 5 and 6 are two views of one of the central auxiliary connecting rods.

Figs. 7 and 8 are two views of one of the outer auxiliary connecting rods.

Figs. 9 and 10 show modified forms of the arcuated members formed on the connecting rods, whereby the arcs occupied by the said members are increased.

The two cheeks 1 and 2 forming the connecting sleeve are secured to the main connecting rod 3 by the screws 4, 4, forming a solid assemblage. This element is revoluble upon two ball bearings 5 and 6 mounted upon the crank pin of the crank shaft. To facilitate the assembling of the parts, the crank-shaft is made in two portions which are secured together by nuts, conical portions, keys and the like. When the said cheeks are assembled together, they comprise the three double grooves 7, 7; 8, 8; 9, 9. The double groove 7, 7 has slidable therein the arcuated portions of the two central auxiliary connecting rods 10, these two auxiliary connecting rods 10 and the main connecting rod 3 being spaced apart at an angle of 120°.

Within the double groove 8, 8 are slidable the arcuated portions of the three intermediate auxiliary connecting rods 11 which are also spaced 120° apart. In the double groove 9, 9 are slidable the arcuated portions of the three outer auxiliary connecting rods 12 which are likewise spaced at 120°. The arcuated portions of the auxiliary rods 11 are cut away at 13 in order to give free passage and movement without contact, to the middle portion of the auxiliary connecting rods and the main connecting rod. The arcuated portions of the auxiliary connecting rods 12 are cut away at 14 and 15 in order to give free passage and movement without contact, to the middle portion of the auxiliary connecting rods 10, the main connecting rod and the auxiliary connecting rods 11.

The device operates in the following manner for rotative or for stationary motors respectively:

In the case of rotative motors, the main connecting rod 3 drawing along with it the two cheeks 1 and 2 rotates about the crank pin through the medium of the ball bearings 5 and 6. The connecting rods 10, 11, 12 are drawn along with the cheeks 1 and 2, but are also caused to approach and recede from each other according to the position of the corresponding pistons at the top or bottom of the cylinders, the amplitude of these oscillations being only 50° or thereabout per revolution.

In the case of stationary motors, the crank pin rotates within the main connecting rod. The auxiliary connecting rods approach and recede from each other by the same angular distance as for the rotative motors.

In both these cases, the auxiliary connecting rods have only a limited angular movement, and the friction of the said rods in the bearings thereof will hence be reduced to a minimum.

The accompanying drawing shows by way of example a nine-cylinder motor provided with three double grooves. However, any suitable number of cylinders may be used such as 5, 7, 11 and the like, and also any suitable number of grooves such as 3, 4, 5 and the like.

Having now described my invention, what I claim as new and desire to secure by Letters Patent is:

1. A connecting rod arrangement for star-shaped motor comprising in combination a main rod head, a crank pin, two separate flanges secured to said crank pin, a central bore provided in said main rod head for the passage of the crank pin, two cheeks surrounding the main rod head, means for securing said cheeks on the main rod head, concentric grooves provided in the inner faces of said cheeks and secondary rods provided on their ends with arcuated portions slidable in two grooves facing each other.

2. A connecting rod arrangement for star-shaped motor comprising in combination a main rod head, a crank pin, two separate flanges secured to said crank pin, a central bore provided in said main rod head for the passage of the crank pin, two cheeks surrounding the main rod head, means for securing said cheeks on the main rod head, concentric grooves provided in the inner faces of the said cheeks and secondary rods provided on their ends with arcuated portions slidable in two grooves facing each other and means allowing the relative displacement of the secondary rods with regard to each other.

3. A connecting rod arrangement for star-shaped motor comprising in combination a main rod head, a crank pin, two separate flanges secured to said crank pin, a central bore provided in said main rod head for the passage of the crank pin, two cheeks surrounding the main rod head, means for securing said cheeks on the main rod head, concentric grooves provided in the inner faces of said cheeks, one set of secondary rods slidable in the central groovs and provided with arcuated portions which are symmetrical with regard to the connecting rod and sets of secondary rods slidable in the other concentric grooves and provided with actuated portions which are cut away in order to give free passage to the adjacent rods.

4. A connecting rod arrangement for star-shaped motor comprising in combination a main rod head, a crank pin, two separate flanges secured to said crank pin, a central bore provided in said main rod head for the passage of the crank pin, two cheeks surrounding the main rod head, means for securing said cheeks on the main rod head, means on the crank shaft for rotatably supporting said cheeks, concentric grooves provided in the inner faces of said cheeks and secondary rods provided on their ends with arcuated portions slidable in two grooves facing each other.

5. A connecting rod arrangement for star-shaped motor comprising in combination a main rod head, a crank pin, two separate flanges secured to said crank pin, a central bore provided in said main rod head for the passage of the crank pin, two cheeks surrounding the main rod head, screws extending through said cheeks and through the main rod head and fastening at the same time said cheeks and said main rod head to each other, concentric grooves provided in the inner faces of said cheeks and secondary rods provided on their ends with arcuated portions slidable in two grooves facing each other.

In testimony whereof I have signed my name to this specification.

LAURENT SEGUIN.